Figure 4:
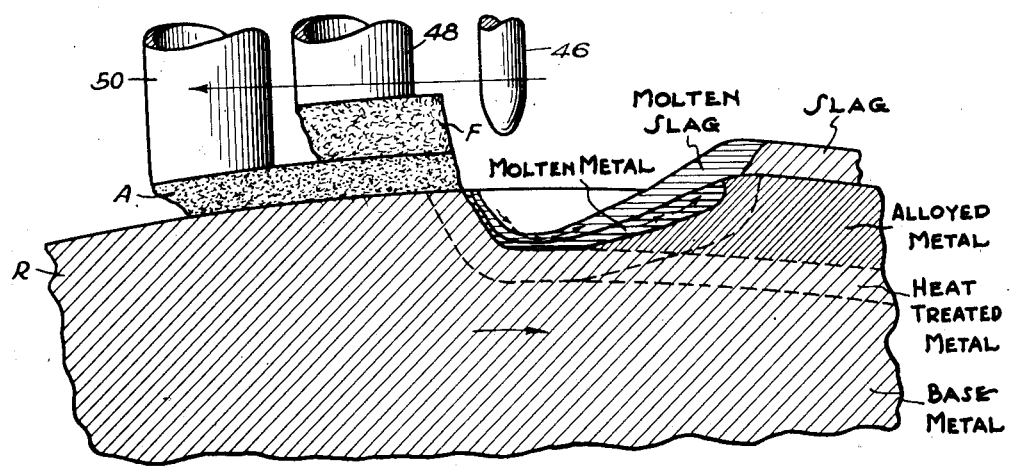

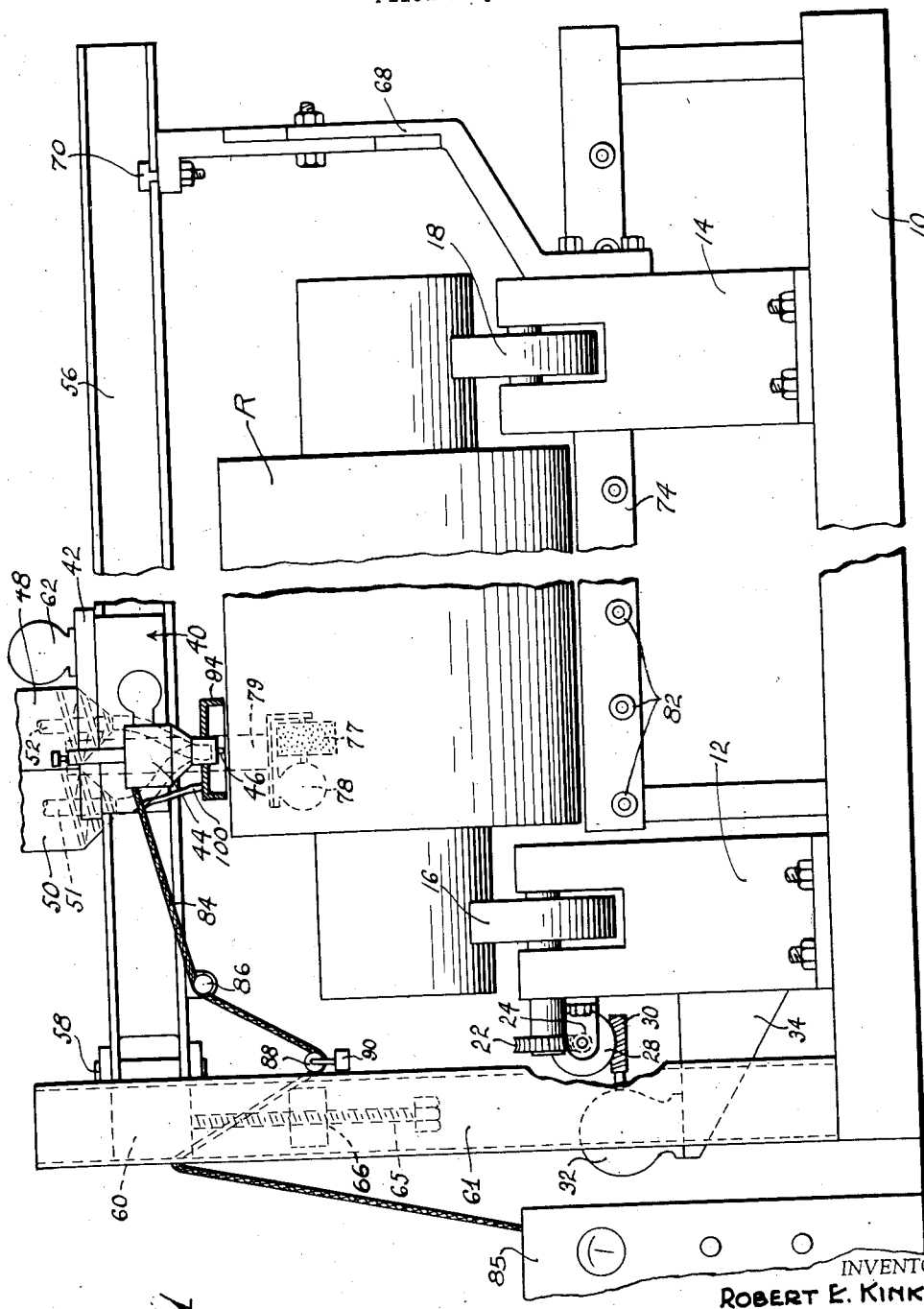

Oct. 10, 1939.  R. E. KINKEAD  2,175,607
METAL-ALLOYING AND HEAT-TREATING MEANS AND METHODS
Filed July 16, 1936  6 Sheets-Sheet 2
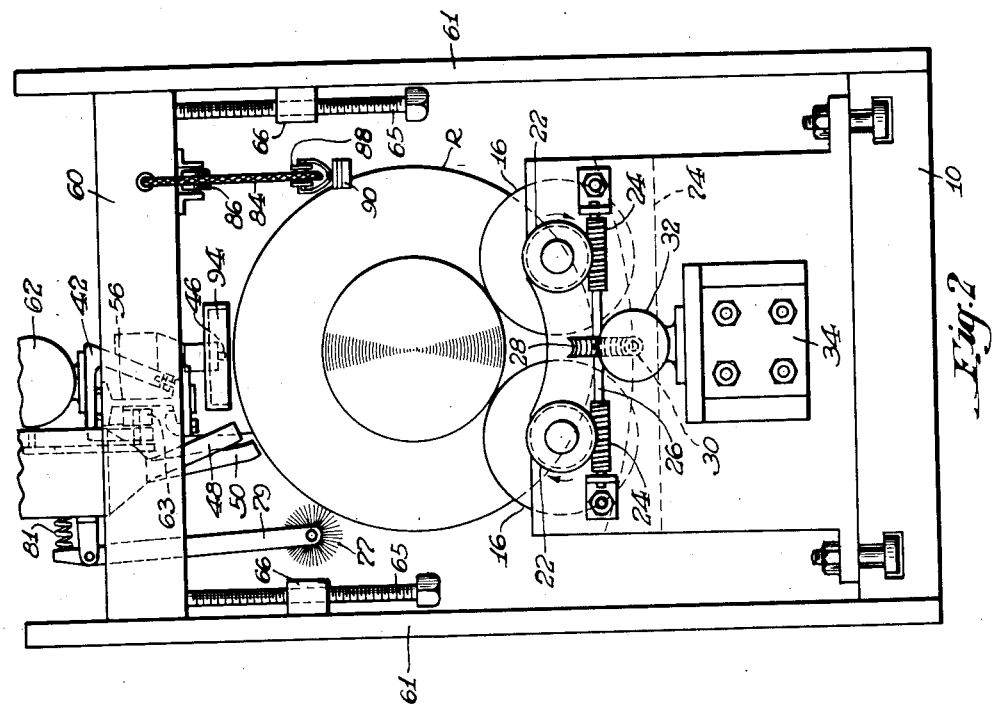
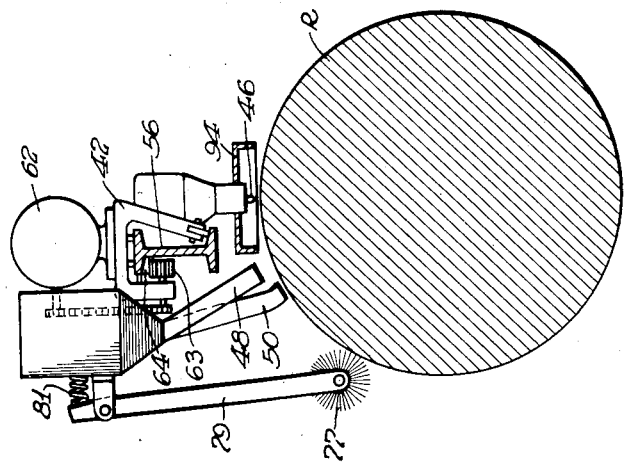
INVENTOR.
ROBERT E. KINKEAD.
BY Brown, Critchlow & Flick
his ATTORNEYS.

Oct. 10, 1939.  R. E. KINKEAD  2,175,607
METAL-ALLOYING AND HEAT-TREATING MEANS AND METHODS
Filed July 16, 1936  6 Sheets-Sheet 3

INVENTOR.
ROBERT E. KINKEAD.
BY Brown, Critchlow & Flick
his ATTORNEYS.

Oct. 10, 1939.　　　R. E. KINKEAD　　　2,175,607
METAL-ALLOYING AND HEAT-TREATING MEANS AND METHODS
Filed July 16, 1936　　　6 Sheets-Sheet 4
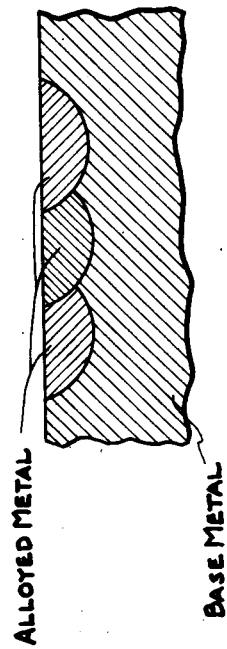
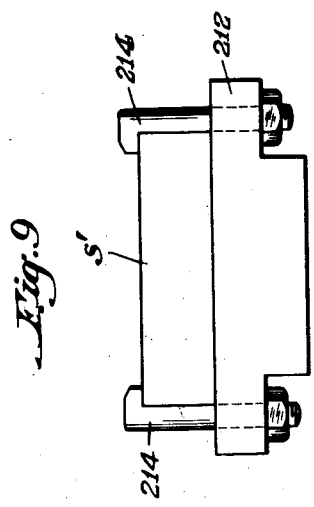
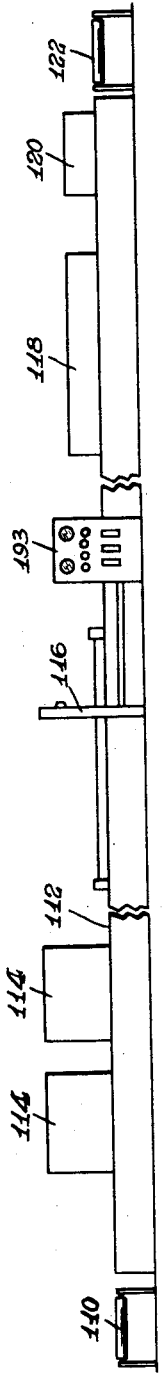
INVENTOR.
ROBERT E. KINKEAD.
BY Brown, Critchlow + Flick
his ATTORNEYS.

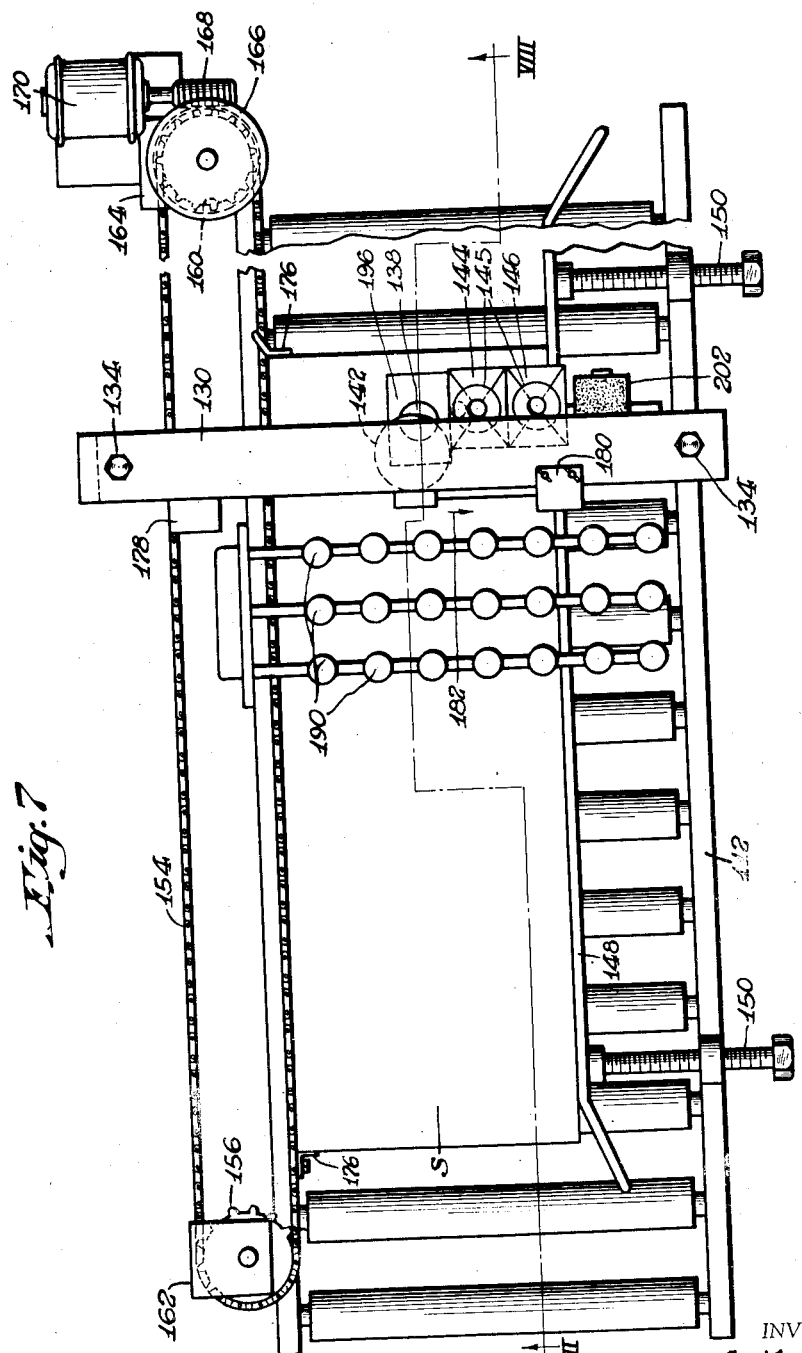

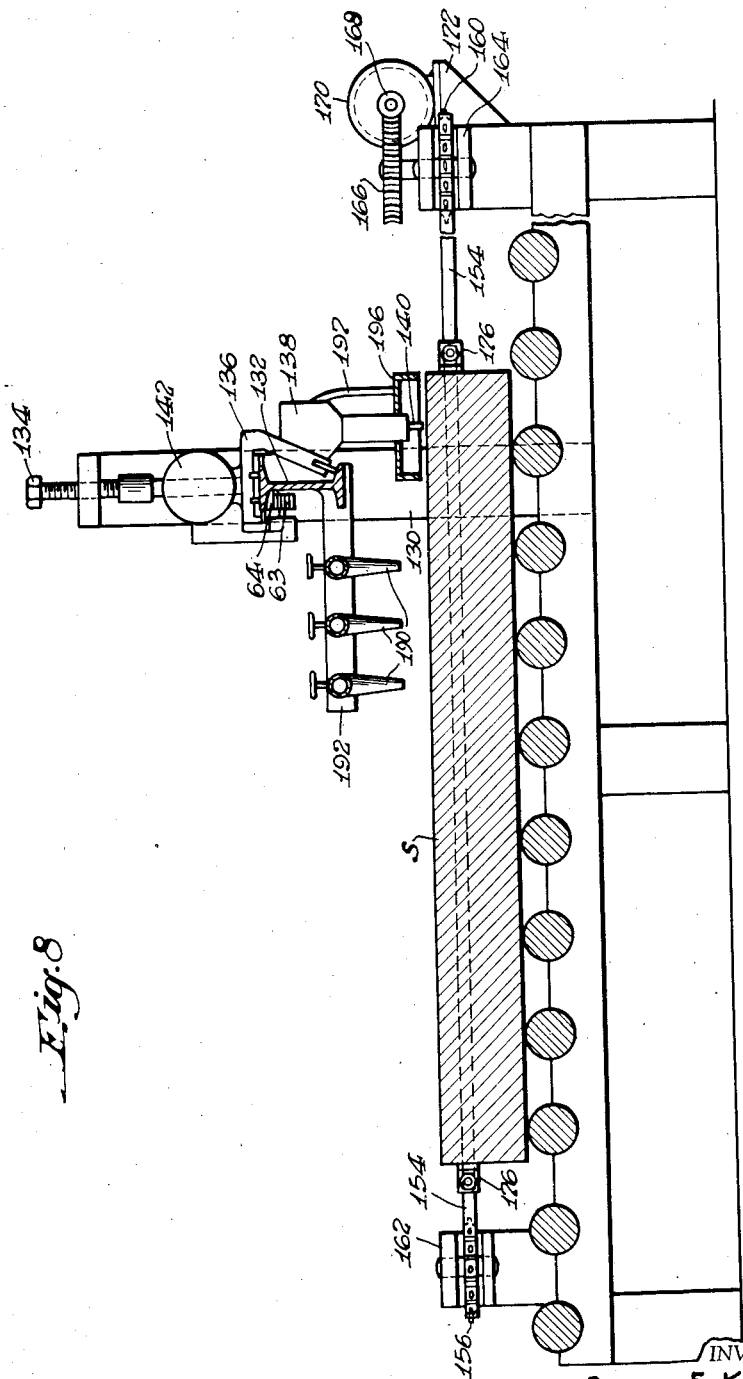

Patented Oct. 10, 1939

2,175,607

UNITED STATES PATENT OFFICE 2,175,607

METAL-ALLOYING AND HEAT-TREATING MEANS AND METHODS

Robert E. Kinkead, Cleveland, Ohio

Application July 16, 1936, Serial No. 90,872

10 Claims. (Cl. 148—10)

This invention relates to apparatus and processes for surface-alloying and bodily heat-treating metal and more particularly is concerned with improved means and methods for manufacturing rolling mill rolls and the like and providing slabs or ingots with exterior surfaces of desired composition.

Prior to my invention it has been proposed to improve the characteristics of cutting and similar tools by welding in blocks of hard alloy metal, such as Stellite, on a base metal of softer, tougher material. This process is fairly satisfactory for certain cutting tools but does not adapt itself to the provision of surfaces of desired composition on rolls, slabs, or ingots. It has likewise been suggested to alloy the base metal of a cutting tool locally by rendering the cutting portion of the tool molten as, for example, by an oxyacetylene torch, and then mixing, an alloying metal in the molten portion by stirring the portion with a rod of the desired alloy. Some attempts have also been made to achieve the same result by an electric arc wherein the electrode is a rod of the alloying metal. Practices of this character however are open to the objection that they are not adapted to the surface-treating of rolls or ingots and other large bodies of metal wherein the alloying material must be uniformly distributed over the entire surface and should penetrate a considerable distance to be effective. Moreover, the cost of making the alloy electrodes or melt bars renders the processes economically undesirable for large work as distinguished from tools. Nor are the processes advantageously employed with associated heat-treating operations as hereinafter more fully described.

The failure of known methods and apparatus to function satisfactorily and economically in the surface-alloying of large metal bodies, such as ingots, is well illustrated by the fact that heretofore the surface of ingots, slabs and the like have been alloyed by several distinct methods. One particular method, for example, has been to attempt to electroplate an alloying material to the ingot so that a soft tough base metal generally of steel with a covering layer of chromium, for example, is provided. This method is objectionable not only due to the very considerable cost involved but also to the fact that only a relatively thin layer of material can be electroplated and that attempts to increase the thickness result in sponging, pitting and other defects in the plated metal.

Another manner proposed for providing an alloyed surface upon a steel slab has been to first electroplate a relatively thin coating of, for example, pure iron upon the base metal with a similar coating being electroplated upon a relatively thin plate of the alloying metal. The base metal and the alloyed plate are then heated and rolled together in a hot rolling mill to achieve a partial, but in many cases an unsatisfactory, bond therebetween. A third method for providing a slab with an alloyed surface has been to place a mass of powdered alloy upon the surface of a slab with the slab then being heated in a furnace to a temperature sufficient to melt the alloy onto the base slab.

The several methods just described and heretofore employed for providing an alloyed surface upon a base metal of different characteristics are subject to certain criticisms and objections which include the lack of an effectual and economical method and apparatus for surface-alloying rolls, ingots and the like. Moreover, in many instances the bond between the alloy metal and the base metal is unsatisfactory, resulting in high scrap losses. Furthermore, considerable time, special equipment and skilled labor are requisite, and the resulting product, as well as the methods and apparatus for producing the product, is not readily adapted to associated heat-treating operations.

It is the general object of my invention to avoid and overcome the foregoing and other difficulties by the provision of improved means and methods for rapidly and inexpensively producing articles of the character described having a uniform surface of desired depth of metal of substantially any composition.

Another object of my invention is the provision of apparatus and processes for the combined surface-alloying of metal masses and heat-treating thereof.

A more particular object of the invention is to provide substantially automatic apparatus adapted to commercially manufacture rolls, slabs, ingots and the like having base portions of relatively tough inexpensive metal and surface portions of harder and/or corrosion-resisting metal of desired thickness.

Another object of my invention is the provision of alloying apparatus and methods adapted to employ basic alloying materials that are of the same character as used in the open hearth furnace, for example, and then reproducing on the metal mass to be surface-alloyed conditions equivalent to the furnace conditions whereby the expensive manufacture of special electrodes is eliminated.

The foregoing and other objects of my invention are achieved by the provision of apparatus including an adjustable frame for receiving the metal mass to be treated. A carbon arc mechanism is supported on suitable means for movement relative to the mass with other means for supplying a train of alloying material on the surface in advance of the travel of the mechanism and having associated means for supplying flux over the alloying material. Included in the combination are means for relatively moving at a constant rate of speed the mass and the carbon arc mechanism so that when the mechanism is energized it progressively renders the surface of the mass molten to a predetermined depth and thoroughly mixes the alloying material in the molten portion of the mass. Preferably the mass is kept at a certain desired temperature during the alloying operation by suitable heating means.

In the practice of the method of my invention the metal mass to be treated is heated to a predetermined temperature and the surface is progressively melted with an electric arc by relatively moving the arc and mass in directions whereby substantially the entire surface of the mass is progressively melted in overlapping areas. The alloying metal in basic form, such as ferro-chrome, etc., is added to the progressively melted portions while they are in the molten state and so that the action of the arc swirls the molten base metal and the alloying metal together to produce a substantially homogeneous alloyed metal. During the alloying operation the molten portions are kept in non-oxidizing condition, and a final heat-treating operation to temperatures below the critical effects the production of a metal mass having a surface portion of alloyed metal which is bonded integrally with the base metal with a zone of gradually reduced hardness between the alloyed metal and the base metal, and free from harmful residual stresses.

Figure 5:
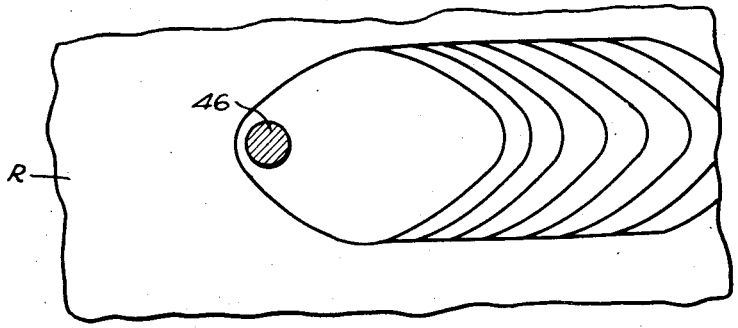

In the accompanying drawings Fig. 1 is a front elevation of one embodiment of apparatus constructed in accordance with the principles of my invention and illustrating the application thereof to the manufacture of rolling mill rolls; Fig. 2 is an end elevation of the apparatus shown in Fig. 1; Fig. 3 is an end elevation of the carbon arc mechanism incorporated in the apparatus; Fig. 4 is an enlarged cross-sectional view illustrating the principle of alloying and heat-treating in accordance with my invention and more particularly shows the electric arc crater; Fig. 5 is a plan view of the mechanism of Fig. 4; Fig. 6 is a side elevation of one embodiment of apparatus constructed in accordance with the principles of my invention and applied to the handling of slabs and ingots; Fig. 7 is an enlarged plan view of the means for handling the slabs and ingots shown generally in Fig. 6; Fig. 8 is a longitudinal vertical sectional view taken on line VIII—VIII of Fig. 7; Fig. 9 is an end elevation of means for supporting a slab during the alloying and heat-treating operation; and Fig. 10 is a cross-section of a metal mass having its surface alloyed in parallel paths and illustrating the overlapping of the paths.

While the principles of my invention may be applied to the construction of apparatus and the operation of processes for broadly surface-alloying and heat-treating metal articles of various weights, shapes and compositions, they are particularly beneficial in the manufacture and treatment of large metal masses and find special application in the production of rolling mill rolls, slabs and ingots. Accordingly, two forms of particular applications of my invention to the handling of rolling mill rolls and slabs have been illustrated and will be described.

Referring to the embodiment of my invention shown in Figs. 1 to 5, numeral 10 indicates a base to which are secured housings 12 and 14. Preferably the housing 12 is fixed to the base 10 whereas the housing 14 is adjustable along the base in order that the housings may be adapted to receive rough machined roll castings of different sizes, such as the one indicated by the letter R. The housings 12 and 14 are provided with a pair of supporting rollers 16 and 18 which are mounted upon shafts journaled in the housings. As will best be seen from Fig. 2, the rollers 16 and 18 are so positioned that they can receive a plurality of sizes of reduced bearing necks such as might be formed on any particular roll handled by the apparatus.

In order to slowly rotate the roll R upon the supporting apparatus just described, the shafts carrying the rollers 16 are provided with worm gears 22 at their outer ends which are driven by worms 24 mounted upon a shaft 26 carrying a worm gear 28 driven by a worm 30 secured to the shaft of a motor 32 mounted upon a bracket 34 fixed to the housing 12. When the motor 32 is operated the rollers 16 are driven to slowly turn the roll R for purposes hereinafter more fully described.

Positioned centrally above the roll R is a carbon arc mechanism, indicated generally by the numeral 40 and including a carriage 42 carrying a control 44 for a carbon arc electrode 46. Also secured to the carriage 42 are hoppers 48 and 50 having downwardly extending discharge spouts which direct the powdered alloy material and the powdered flux contained in the hoppers 48 and 50, respectively, in trains along in front of the path of movement of the electrode 46, as seen in Fig. 4. The hopper discharge spouts are provided with feeding means, such as screws 51 and 52, which are driven in any suitable manner, as for example, by the carriage-moving means later to be described.

Preferably the carbon arc welding mechanism 40 is mounted to be moved out of the way so that the roll R can be positioned on or lifted off from the rollers 16 and 18 by an overhead crane. Suitable mechanism for achieving the desired mounting for the mechanism may include an I-beam 56 which is pivotally mounted at one end to a pin 58 secured to a suitable bracket extending laterally from a cross-head 60 carried in a rectangular frame 61 secured to the base 10 at its one end. The carriage 42 of the carbon arc mechanism 40 is slidably mounted upon the I-beam 56 and the position of the carriage is controlled by the provision of a motor 62 having means such as a pinion gear 63 engaging with the I-beam 56 and more particularly a rack 64 secured thereto. The vertical position of the cross-head 60 and thus the I-beam 56 is controlled by screws 65 threaded through boxes 66 integral with the frame 61 and with the screws extending into engagement with the cross-head 60.

The other end of the I-beam 56 may be supported in any desired manner as by the provision of an adjustable height bracket 68 secured to the end of the housing 14 and having a vertically extending upright portion carrying a pair of clamps 70 adapted to secure the I-beam removably to the bracket 68 and thereby support the I-beam.

Positioned below the roll R and extending between the housings 12 and 14 is a cradle-shaped heater 74. The heater 74 is preferably electrical so as to eliminate products of combustion. The effective length of the heating operation is taken care of by the provision of a plurality of switches 82 secured at spaced distances along the heater 74. In this manner, whether the roll is long or short, any desired amount of heat can be provided by opening or closing one or more of the switches 82. Extending from the carriage of the carbon arc mechanism is a flexible cable 84 which may be brought to any position desired, as for example to a control panel 85, since the cable runs over pulleys 86 and 88 of which the latter carries a weight 90 normally keeping the cable 84 taut.

While in many instances it is entirely feasible to effect the alloying operation of the surface metal of the roll without an inert atmosphere of gas inasmuch as the flux heretofore generally described provides a non-oxidizing atmosphere around the carbon electrode during the alloying operation, it still is part of my inventive concept to enclose the carbon electrode 46 heretofore described, in a hood of the character indicated at 94 in Fig. 1. More particularly the hood 94 preferably takes the form of an open bottom box secured to the support around the carbon arc and extending down close to the surface of the roll R.

The inside of the hood when employed is filled with non-oxidizing gas either inflammable or non-inflammable, but preferably inflammable, and a conduit 100 is connected at the top of the hood for this purpose. When the gas is inflammable it is ignited and burns around the lower edges of the hood as it escapes into contact with the air. In all events the carbon electrode operates in a non-oxidizing atmosphere so that an alloying operation of the desired character is obtained. In employing the hood 94 the amount of flux F used can be materially reduced.

In Figs. 4 and 5 is more specifically illustrated the particular relation of the carbon electrode 46, the hoppers 48 and 50 and the general operation of the alloying apparatus. The base metal of the roll R is first covered with a train of powdered alloying metal marked A, preferably in the form of the basic alloying ore, and which is in turn covered with a layer of flux F. The relative movement of the base metal of the roll R and the electrode 46 and the spouts from the hoppers 48 and 50 is as shown by arrows so that once an arc is struck between the electrode 46 and the base metal a crater is created by the heat of the arc. The relative movement causes the electrode and its associated mechanism to be fed in a path over the surface of the base metal and since this path is in the direction of the train of metal A and flux F, the flux is constantly gasified, the alloying metal rendered molten and circulated through the crater of the metal of the roll R, as shown by the arrows in Fig. 4. Since a little metal in the form of the alloy is added to achieve the alloying operation, the diameter of the roll R is increased slightly as illustrated. The relative movement of the electrode and the base metal thus effects a progressive melting of the surface of the roll R with the associated alloying operation.

As indicated above, my improved process and apparatus are particularly adapted to alloy with the materials, such as ferro-chrome, ferro-manganese, etc., ordinarily employed as alloying constituents in the open hearth or other steel-making processes. This is because I obtain substantially a miniature open hearth furnace on the surface of the metal mass alloyed and positively control the character and operation thereof. The advantages of employing the ores or basic alloying materials rather than the special composition electrodes or alloy rods of the prior art are important and particularly result in rendering the process economical.

Not only is the base metal alloyed as described by my process and apparatus but I provide for a controlled heat-treating operation which has been indicated to affect the area enclosed by the dotted lines in Fig. 4. The metal within this line is brought to a relatively high temperature and particularly above the critical temperature and, as the electrode passes on, is rapidly quenched by dissipation of the heat therein to the relatively heavy and cool body of metal surrounding it in the roll. The particular character and effect of the quenching operation, which is highly important, is dependent upon the preheated temperature of the roll and control of this temperature and the resulting phenomena are a notable part of my inventive concept. In all events a definite tempering and hardening effect on this intermediate portion of the roll is achieved. The particular method of heat-treating the roll further will be discussed hereinafter in conjunction with the method of operating the above-described apparatus.

In the operation of the apparatus the clamps 70 are loosened to allow the I-beam 56 to swing back out of position, and a roll R, usually handled by a crane, is lowered onto the rollers 16 and 18 carried by the housings 12 and 14 which may be adjusted toward and from each other along the base 10 in order to properly receive the particular roll size to be handled. The I-beam 56 is then swung back into position and is clamped to the bracket 68 by the clamps 70. The vertical position of the I-beam can be adjusted by varying the position of the cross-head 60 through screws 65 and by adjusting the height of the bracket 68 so that the position of the electrode 46 relative to the roll R is as desired to achieve the best results.

Inert gas is then passed through the conduit 100 into the hood 94. Preferably inflammable gas is employed and around the lower edges of the hood it may be ignited with the inflow of the gas compensating for the amount of gas being burned around the lower edge of the hood 94. The operator by way of the control cabinet energizes motor 32 to start the roll R turning slowly on its own axis. The arc between the electrode 46 and the roll R is established and the motor 62 controlling the position of the carbon arc carriage 42 is energized to move it slowly along the I-beam. The two motors are coordinated as to speed so that a helical path is progressively rendered molten upon the surface of the roll.

Since the life of the carbon electrode is between about fifteen to thirty minutes it is sometimes impossible to cover the entire surface of the roll when the helical paths of progressively alloyed metal overlap each other. I have found it highly advisable, however, to avoid stopping and starting the carbon arc in the middle of the roll. This is very apt to result in an objectionable spotting of the roll and I therefore preferably time the movement of the carriage 42 along the I-beam 56 so that the carbon electrode 46 is at the end of the roll before it is consumed. If the operation of the apparatus in this manner results in spaces between the helical convolutions a new carbon electrode is substituted for the used electrode and the operation is repeated with the second convolutions being formed so as to overlap the first, as shown in Fig. 10, and in this manner, if necessary, two or more repetitions of the process result in the entire surface of the roll being perfectly alloyed and heat-treated as heretofore described. The overlapping of the progressively molten and solidified areas of the roll has been found not to impair the uniform characteristics of the alloyed surface, which factor is important.

In the operation of the apparatus and particularly when the areas progressively alloyed are overlapped I have found it important to remove all slag and flux from the surface of the roll prior to overlapping. In the embodiment of the apparatus illustrated this is accomplished by the provision of a rotary wire brush 77 driven by a motor 78 and carried by an arm 79 pivotally supported by the carriage and urged into engagement with the roll by springs 81.

The alloying and heat-treating operation is achieved as particularly illustrated in Fig. 4 by the feeding of a train or path of alloying material A and a covering layer of flux F, from the hoppers 50 and 48 respectively, over the surface of the roll just in advance of the movement of the electrode over the roll. In the ordinary operation of my apparatus in the treating of a relatively large roll as, for example, to be employed as a working or backing roll in a mill for hot or cold rolling of metal, the type of carbon arc electrode employed may draw 1000 amperes of current at a pressure of about 40 volts. The crater formed by the arc is from about 1¼ to about 1⅝ inches wide and has a depth of approximately ⅝ of an inch, and the rate of movement between the surface of the metal and the electrode is approximately 5 inches per minute. The character of the crater and the associated parts are indicated in Fig. 4. In this specific example of the operation of my invention the base metal of the roll is heated to about 400° F. and this heat is maintained during the alloying operation by means of the heater 74.

I have discovered that the temperature of the roll R prior to alloying is of particular importance. It is possible to alloy in accordance with my invention without maintaining the base metal at an elevated temperature. The result is very often the formation of cracks, brittleness, pitting and other objectionable characteristics in the alloyed surface. But, when the operation is performed with the base metal heated to the neighborhood of 400° F. the severity of the quenching action of the base metal is radically reduced and a much smoother blend between the base metal and the alloyed surface results. Moreover, I particularly contemplate maintaining the temperature of the base metal during the alloying operation at any selected point above or below 400° F., as for example from 250° F. to 1000° F., to increase or reduce the heat-treating operation associated with the alloying process. The temperature of the roll is controlled by the heater 74 which is illustrated as electrical but which may of course be fluid.

Ordinarily it is difficult to render the base metal of the roll fluid to a depth greater than approximately ⅝ of an inch. Any attempt to increase the current results in an increase in the area of the crater formed by the arc but does not increase the depth. Ordinarily I have found that the most satisfactory way of obtaining the greatest depth of penetration of the base metal, i. e., the greatest depth of the crater, is to decrease the speed of movement of the electrode over the base metal. In the manufacture of rolling mill rolls the composition of the base metal of the roll is generally about .35 to .40 per cent carbon, 1.0 per cent manganese, 1.0 per cent chrome, and the remainder substantially iron. I employ as an alloying material A a ferro-chrome of a composition approximately 80 per cent chromium, .05 per cent carbon, and the remainder substantially iron. Approximately one-half pound of this ferro-chrome alloy per foot of travel of the electrode is used.

In heat-treating the roll after the surface-alloying operation, the entire roll is heated to a temperature of approximately 1200° F. which when cooled from that temperature slowly renders the alloyed surface of the roll harder and the intermediate quenched portion of the roll immediately below the alloyed surface is relieved of all strains and stresses resulting from the quenching operation. This portion of the roll still retains, however, certain improved physical characteristics so that the resulting roll comprises a relatively soft but tough core and a very hard but non-brittle alloyed surface and an intermediate layer completely integral with the alloyed surface and base metal of a quenched heat-treated character having characteristics which are properly adapted to transmit all forces between the roll surface and the core. The alloyed surface is particularly free from blow-holes and pit-marks and is surprisingly uniform in its physical properties and chemical analysis throughout substantially its entire depth. The swirling action of the arc in conjunction with the particular way of feeding the alloying material into the molten pool formed by the electrode results in the indicated satisfactory characteristics. Moreover, I believe that the operation of the arc in an atmosphere of an inert gas further eliminates any possibilities of oxidation during the alloying operation.

While the apparatus above described has relied upon the use of a covering hood or box 94 during the alloying operation with the use of inert gas fed into the top of the box and burnt at the bottom, I also contemplate eliminating the hood 94 and if this is done, the flux F is relied on to eliminate oxygen from the molten pool progressively formed by an electrode. In all events, when the surface-alloying of the roll R has been completed as heretofore described, clamps 76 are loosened, and the I-beam 56 is swung back on its pivot pin 58 with the carbon arc mechanism 40 generally positioned near the pin 58 so as to relieve the weight on the I-beam 56. The roll R is then picked up from the supporting rollers 16 and 18 carried by the housings 12 and 14 and is heat-treated as above described. After heat-treating the surface of the roll is ground to remove surface roughness.

The embodiment of the invention illustrated in Figs. 6 to 9 is particularly adapted to handle slabs or ingots and to surface alloy and heat-treat them in a manner generally similar to that heretofore described. Having particular reference to Fig. 6, the numeral 110 indicates a conveyor in a production line with a conveyor 112 extending therefrom to the apparatus of my invention. Positioned along the conveyor are heating furnaces 114, the surface-alloying apparatus 116, turnover mechanism 118, a surface-grinder 120, and a return conveyor 122.

The surface-alloying apparatus 116, as best seen in Figs. 7 and 8, is directly associated with the conveyor 112 and includes a frame 130 slidably supporting an I-beam 132 whose vertical position in the frame may be controlled by suitable means such as screws 134. The I-beam 132 slidably supports a carriage 136 carrying the carbon arc mechanism 138 including an electrode 140. A motor 142 controls the lateral position of the carriage 136 upon the I-beam 132 and hoppers 144 and 146 respectively contain the alloying material A and a flux F with suitable spouts for feeding these materials onto the surface of the metal to be treated in a manner similar to that illustrated in Fig. 4.

The conveyor 112 adjacent the frame 130 is provided with a side guide 148 adjustably positioned as by means of screws 150. In this manner a slab or ingot, marked S, can be positioned upon the conveyor 112 as it moves below the frame 130. Means for moving the slab S below the frame 130 may take a plurality of forms but in the embodiment of my invention illustrated they include an endless chain 154 surrounding sprockets 156 and 160 mounted upon vertically extending shafts journaled in brackets 162 and 164. One of the shafts is provided with a worm gear 166 which engages with a worm 168 mounted upon the shaft of a motor 170 carried upon a bracket 172 fixed as, for example, to the bracket 164. The chain 154 is provided with adjustable lugs 176 which engage with opposite ends of the slab S so that operation of the motor 170 moves or indexes the slab through the frame 130 in any desired manner.

I particularly contemplate the provision of limit switches 178 and 180 upon the I-beam 132, which switches engage with the ends of the carriage 136 so that the movement of the carriage is automatically reversed when the limit switches are struck. The position of the limiting switch 180 is adjustable along the I-beam so that slabs of different widths can be handled. As has been indicated in Fig. 8, feed screws 145 are ordinarily incorporated with the hoppers and preferably the drive for the feed screws of the several hoppers is associated with the drive for the carriage as effected by the motor 142 with overrunning ball clutches effecting the desired drive of the feed screws only when the motor 142 is turning to effect movement of the carriage in the direction of the arrow 182.

By the mechanism just described the carriage is reciprocated continuously between the limit switches 178 and 180 which automatically change the direction of movement of the carriage. The carbon arc mechanism is of course only energized when the carriage is reciprocated in the direction of the arrow 182 and the starting and stopping of the arc can readily be accomplished by the limit switches. Simultaneously with the change in direction of movement of the carriage, a stepped forward movement of the slab S is effected. This ordinarily is controlled automatically by means of the limit switches 178 and 180 functioning to operate indexing motor 170 to move the slab S forward under the carriage a distance sufficient to cause the next movement of the carriage and electrode across the slab to progressively melt a zone of the surface of the slab which just overlaps the transverse zone previously alloyed. However, in certain instances where the slab is narrow the metal may be too hot to provide immediate overlapping. I therefore contemplate a double or triple indexing movement with subsequent operations to provide overlapping as will be understood from the description of the roll-handling apparatus. Since the actual electrical connections required are well within the skill of the ordinary electrician, they have not been shown in detail.

Ordinarily in the practice of my invention, the slab or other mass of metal to be alloyed is preheated in any manner, as, for example, by the furnace 114, to a temperature usually in the neighborhood of about 400° F. prior to the surface-alloying operation. As above explained, this materially assists in preventing a sharp line of demarcation between the alloyed metal and the base metal and likewise eliminates the brittleness of any intermediate layer of heat-treated, quenched but unalloyed metal between the alloyed metal and the base metal.

I contemplate several ways of maintaining the temperature of the preheated slab during the alloying operation since it is important to maintain the temperatures substantially uniform during the operation to insure uniform characteristics of the alloyed product. Probably the simplest manner of maintaining the temperature of the slab during the alloying operation is by the provision of a plurality of burners 190 connected to suitable manifold pipes and supported by a bracket 192 secured to the I-beam 132 so that the burners are vertically adjustable with the I-beam to take care of slabs or ingots of different vertical height. Preferably the burners are positioned as shown in Fig. 7 and are provided with individual valves whereby any particular burner can be opened or closed so that the intensity of the heating action, as well as the area heated, can be controlled within wide limits.

It should be understood that the burners may be positioned below or at the sides of the slab and that furthermore electrical heating means may be utilized as heretofore described if the products of combustion of the burners is undesirable. In the use of burners 190 as described the alloying operation relies upon the flux F and the gases formed during welding to prevent oxidation or other faults in the alloying operation. Preferably the controls for the motor 170, electrode 140, and motor 142 are brought out to a control cabinet 193 positioned in the front of the apparatus whereby the operator tending the apparatus can readily control the desired alloying operation.

I further may provide a hood 196 which is positioned around the electrode 140 and extends into close proximity to the slab S. Non-oxidizing and usually inflammable gas is passed to the top of the hood by a conduit 197 and the gas is ignited at the bottom of the hood so that the carbon electrode operates in an atmosphere of non-oxidizing gas during the alloying operation.

In the operation of the apparatus a surprisingly satisfactory alloying operation is achieved when the electrode is moved, for example, at a speed of about 6 inches per minute while drawing 800 amperes at 34 volts, with the slab preheated to a temperature between about 300° and about 500° F., to progressively form a crater about 5/8 inch deep and 1 inch to 1¼ inches wide across the surface of the slab. The action of the arc, as best seen in Figs. 4 and 5, tends to melt the alloying material and to swirl it very uniformly through the base metal. Approximately ½ pound of ferrochrome containing about 80 per cent chromium and about .05 per cent carbon, and the remainder substantially iron, is deposited on the slab surface every 15 inches. The base metal of the slab may have rather widely varying composition but ordinarily is a standard open-hearth or Bessemer composition, cheaply and advantageously made into slab or ingot form.

It is thus possible by my invention to provide standard steel ingots or slabs with alloyed surfaces which are of any desired composition to provide corrosion-resisting or increased strength characteristics, and, moreover, the slab or ingot is particularly adapted for subsequent rolling or treating operations since there is no tendency for the alloyed surface to separate from the base metal.

In the operation of the invention when the slabs or ingots are relatively thick, there is little tendency for them to buckle out of shape during the heat-treating or alloying operation. However, when the slabs treated are comparatively thin, there may be some tendency for them to buckle during the operation. Accordingly, as illustrated in Fig. 9, relatively thin slabs, such as shown at S', may be mounted upon a supporting base 212 by means of clamps 214. The entire base with the slab secured thereon is then passed through the alloying apparatus as if it were a single slab. I also contemplate positioning the means for maintaining the heat of the slab below it in an opening in the conveyor 112 and counterbalancing any tendency of the slab to warp by balancing the heat of the arc with heat from below.

Once the slab S has been provided with an alloyed surface on one side it may be moved along the conveyor 112 to the turnover apparatus 118 which turns the slab to present any other desired surface, generally the opposite, to an upward position so that the slab can be returned upon the conveyor 112 to the alloying apparatus and have the then upper surface alloyed. When the desired number of surfaces have been alloyed the slab is passed upon the conveyor 112 to any desired mechanism but preferably is first taken to the surface grinder 120 which smooths down the alloyed surfaces of the slab so that it can be rolled after being returned as, for example, on the conveyor 122 to the soaking pits to be heat-treated.

As above described, in conjunction with the alloying of the surface of mill rolls, I contemplate heat-treating the surface-alloyed slabs in substantially the same manner when necessary, although heating to rolling temperature and rolling takes care of most cases. More particularly, after the surface-alloying operation the metal immediately below the surface metal rendered molten by the electrode is in a state of heat-treated and quenched metal, and the surface metal may also show quenched characteristics due to the considerable volume of metal behind or beneath the portion heated by the electrode. This metal rapidly draws the heat from the metal heated by the electrode and effects the quenching operation.

More specifically, when operating on a steel slab having an initial content of about .30–.90 per cent carbon, and possessing an original shore hardness of about 25 to 40, the hardness of the alloyed surface when an alloying material of the character and in the amounts described is employed, has resulted in a shore hardness of about 60 to 70 in the alloyed metal and a shore hardness in the intermediate layer of over 30 and increasing toward the alloyed surface layer. Preferably incorporated in the apparatus are means for removing the scale and flux from the surface of the slab prior to the overlapping alloying operation and these means may include a rotary wire brush 202 mounted on the carriage 136 and operated as heretofore described in conjunction with the roll-alloying apparatus and method.

While the invention has been described as being particularly adapted for the surface-alloying of slabs and rolls, certain of the features thereof are beneficial in the manufacture or treatment of other articles as, for example, frogs and crossings for railroad use, now ordinarily made of solid alloys containing about 12 per cent manganese. The frogs and crossings can be made of ordinary steel and surface alloyed with the ferro-chrome alloy herein described to produce articles which are in many respects more satisfactory than the manganese-iron frogs and crossings, with the operation being rapidly and inexpensively performed by my improved apparatus and processes. Likewise it is possible to alloy the surface of so-called station rails to be employed in railroad tracks adjacent points where trains customarily stop and start and usually where hollows in the rails occur. Rails treated as herein described and by the apparatus disclosed can be inexpensively manufactured and result in a materially improved product.

The principles of my invention are broadly applicable to the surface-alloying and heat-treating of other materials than the particular examples herein set forth. For example, basic alloying materials of chrome-vanadium, phosphorus-copper, copper-manganese, and many others may be used. Also the compositions of the base metals alloyed can be within relatively wide limits except in the manufacture of rolling mill rolls or other specific instances where the examples given result in the most satisfactory article. Furthermore, many of the advantages of my invention are retained even where powdered, ribboned or rodded alloy metal is employed instead of the basic alloying agents.

While in accordance with the patent statutes several forms of the apparatus incorporating the principles of the invention have been illustrated and described in detail and several methods of practicing the invention have been completely discussed, it should be understood, however, that the invention is not limited thereto or thereby but is defined in the appended claims.

I claim:

1. In combination, a conveyor for supporting a slab, means for controlling the position of the slab on the conveyor, a track, vertically adjustable means mounting the track above and transversely of the conveyor, a carriage movably supported on the track, means controlling the position of the carriage on the track, a carbon arc mechanism including an electrode mounted on the carriage, a hopper on the carriage having a spout extending into proximity to the slab and in line with the movement of the carriage thereover, means positioned in the line of movement of the carriage for cleaning the surface of the slab, means of adjustable size and intensity for heating the slab during the surface-alloying operation, and means associated with the carbon arc mechanism for causing the electrode to operate in a non-oxidizing medium.

2. In combination, a conveyor for supporting a slab, means for controlling the position of the slab on the conveyor, a track, means mounting the track above the conveyor, a carriage movably supported on the track, means controlling the position of the carriage on the track, a carbon arc mechanism including an electrode mounted on the carriage, a hopper on the carriage having a spout extending into proximity to the slab and in line with the movement of the carriage thereover, means for cleaning the surface of the slab, means for heating the slab, and means associated with the carbon arc mechanism for causing the electrode to operate in a non-oxidizing atmosphere.

3. In combination, a conveyor for supporting a slab, means for controlling the position of the slab on the conveyor, a track, means mounting the track above the conveyor, a carriage movably supported on the track, means controlling the position of the carriage on the track, a carbon arc mechanism including an electrode mounted on the carriage, means for supplying controlled amounts of alloying material to the slab adjacent the electrode, means for cleaning the surface of the slab, means for heating the slab, and means associated with the carbon arc mechanism for causing the electrode to operate in a non-oxidizing atmosphere.

4. In combination, a conveyor for supporting a slab, means for controlling the position of the slab on the conveyor, a track, means mounting the track above the conveyor, a carriage movably supported on the track, means controlling the position of the carriage on the track, a carbon arc mechanism including an electrode mounted on the carriage, means for supplying controlled amounts of alloying material to the slab adjacent the electrode, and means associated with the carbon arc mechanism for causing the electrode to operate in a non-oxidizing atmosphere.

5. That method of surface-alloying a metal mass which comprises preheating the mass to raise it to a temperature of at least about 400° F., progressively melting portions of the surface of the mass with a carbon electrode electric arc by relatively moving the arc and mass at a mechanically controlled and constant speed in directions whereby substantially the entire surface of the mass is melted in overlapping areas, adding basic alloying material to the progressively melted portions while in the molten state and so that the action of the arc swirls the base metal and the basic alloying material together in substantial homogeneity, maintaining the molten portions in non-oxidizing condition at all times, surface-grinding the resulting mass and heat-treating the resulting mass to temperatures below the critical and of about 1200° F.

6. That method of alloying a metal mass which comprises heating the mass to raise it to a temperature of above about 400° F., progressively melting portions of the surface of the mass with an electric arc by relatively moving the arc and mass in directions whereby substantially the entire surface of the mass is melted in overlapping areas, adding alloying means to the progressively melted portions while in the molten state and so that the action of the arc swirls the base metal and the alloying means together in substantial homogeneity, maintaining the molten portions in non-oxidizing condition during the operation, and heat-treating the resulting mass to temperatures below the critical.

7. That method of treating a metal roll which comprises heating the mass to raise it to a temperature of at least about 300° F., progressively melting portions of the surface of the roll with a carbon arc by relatively moving the arc and roll in substantially a helical direction whereby substantially the entire surface of the mass is melted in overlapping helically extending areas, adding controlled amounts of ferro-chrome to the progressively melted portions while in the molten state and so that the action of the arc swirls the base metal and the ferro-chrome together in substantial homogeneity, maintaining the molten portions in non-oxidizing condition, and heat-treating the resulting mass to temperatures below the critical and between about 900° F. and about 1200° F.

8. That method of alloying a steel slab which comprises heating the mass to raise it to a predetermined temperature, progressively melting portions of the surface of the mass with a carbon arc by relatively moving the arc and slab in directions whereby substantially the entire surface of the mass is melted in overlapping areas, adding controlled amounts of alloying ore to the progressively melted portions while in the molten state and so that the action of the arc swirls the base metal and the alloying ore together in substantial homogeneity and with the formation of a surface slag, and heat-treating the resulting mass to temperature below the critical.

9. Apparatus for surface-alloying a metal body comprising in combination carbon arc means for melting the surface of the body progressively from one end to the other, means for supplying alloying material to the molten surface, and heating means other than the melting means for preheating to and maintaining the metal body at a substantially uniform temperature of at least about 400° F. during the entire operation.

10. That method of alloying a metal mass which comprises heating the mass to raise it to a temperature of above about 400° F., progressively melting portions of the surface of the mass with an electric arc by relatively moving the arc and mass in directions whereby substantially the entire surface of the mass is melted in overlapping areas, adding alloying means to the progressively melted portions while in the molten state and so that the action of the arc swirls the base metal and the alloying means together in substantial homogeneity, and maintaining the molten portions in non-oxidizing condition during the operation.

ROBERT E. KINKEAD.